No. 741,734. Patented October 20, 1903.

UNITED STATES PATENT OFFICE.

HERMANN H. SPOHN, OF BOSTON, MASSACHUSETTS, ASSIGNOR TO CARTER'S INK COMPANY, OF BOSTON, MASSACHUSETTS, A CORPORATION OF MASSACHUSETTS.

INK.

SPECIFICATION forming part of Letters Patent No. 741,734, dated October 20, 1903.

Application filed April 13, 1903. Serial No. 152,337. (No specimens.)

*To all whom it may concern:*

Be it known that I, HERMANN H. SPOHN, a subject of William, Emperor of Germany, residing at Boston, in the county of Suffolk and State of Massachusetts, have invented a new and useful Improvement in Inks, of which the following is a full, clear, and exact description.

My invention relates to an improvement in inks especially adapted for laundry-work, stenciling, stamp-canceling, and similar purposes. Such inks require to have a permanent and durable color, preferably very black, one that penetrates quickly and unites readily with the material upon which it is used, dries quickly, and cannot be removed readily by any of the common chemical solvents.

Such an ink is the product of the following-named ingredients, compounded substantially as described: For the manufacture of ten pounds of such ink I take nine ounces of nigrosine base and dissolve it in about two pounds and thirteen ounces of toluidin, and in order to obtain a quick and thorough union of its ingredients I heat the toluidin while the nigrosine is being dissolved therein to a temperature of about 150° Fahrenheit. This mixture is then allowed to cool to about 75° Fahrenheit, and there is then added to it by stirring and at about that temperature about three pounds and six ounces of rosin-oil. After this has been incorporated with the toluidin and dissolved nigrosine base there is added by agitation and at about 70° to 75° Fahrenheit about two pounds and thirteen ounces of fluid tar of the kind distilled at gas-works and which has not been redistilled or treated in any way excepting to exclude water. This combines readily with the mixture of the nigrosine base, toluidin, and rosin-oil and forms an ink which is sufficiently fluid for the purposes specified, will not dry quickly on an inking-pad, has large penetrating effect on application to paper, cloth, or other absorbent material, combines quickly with its fiber, dries quickly in place, is indelible and non-soluble and is very durable, does not blur, and is black in color. It is also fast against the usual chemical solvents.

There may be added to the solution, if it is desired to give the ink a solider black effect, lampblack to the extent of about seven and one-half ounces for the volume named, and when lampblack is used it is ground into the composition in an ordinary paint-mill.

While I have given substantially the proportions which I prefer to use in making a given quantity of the ink, still I would say that the proportions may be varied to any reasonable extent without departing from the essential spirit of the invention, the vital element of which I consider to be the employment of the coal-tar, because it is that element which combines the color so readily and completely with the fiber of the paper, cloth, or other material and serves to hold it against chemical solvents.

In lieu of the rosin-oil any other oil suitable for the purpose may be used as an equivalent, and for lampblack there may be used as an equivalent carbon-black or any other similar black coloring-matter.

Any equivalent for the nigrosine base may be used, and, among others, is indulin base, which is really one form of a nigrosine base.

Having thus fully described my invention, I claim and desire to secure by Letters Patent of the United States—

1. A composition for inks of the character specified, comprising a nigrosine base, toluidin, rosin-oil and tar in about the proportions stated and combined together.

2. In a composition for an ink of the character specified, a nigrosine base dissolved in toluidin and combined with rosin-oil, and coal-tar fluid combined therewith as a fixing agent.

3. An ink of the character specified comprising a mixture of a nigrosine base, toluidin, rosin-oil and coal-tar fluid and to which lampblack is added to deepen the color.

HERMANN H. SPOHN.

Witnesses:
F. F. RAYMOND, 2d,
SAUL SIPPERSTEIN.